United States Patent [19]
Hang et al.

[11] Patent Number: 5,404,289
[45] Date of Patent: Apr. 4, 1995

[54] CONTROLLER APPARATUS HAVING IMPROVED TRANSIENT RESPONSE SPEED BY MEANS OF SELF-TUNING VARIABLE SET POINT WEIGHTING

[75] Inventors: Chang C. Hang; Lisheng Cao, both of Singapore, Singapore

[73] Assignee: National University of Singapore, Singapore

[21] Appl. No.: 113,014

[22] Filed: Aug. 30, 1993

[51] Int. Cl.⁶ ............................................. G05B 13/02
[52] U.S. Cl. ................................. 364/148; 364/157; 364/162
[58] Field of Search ............... 364/148, 152, 157, 162, 364/177

[56] References Cited

U.S. PATENT DOCUMENTS

| | | | |
|---|---|---|---|
| 4,539,633 | 9/1985 | Shigemasa et al. | 364/162 |
| 4,602,326 | 7/1986 | Kraus | 364/158 |
| 4,641,235 | 2/1987 | Shigemasa et al. | 364/149 |
| 4,755,924 | 7/1988 | Hiroi | 364/148 |
| 4,903,192 | 2/1990 | Saito et al. | 364/157 |
| 5,195,028 | 3/1993 | Hiroi | 364/161 |
| 5,268,625 | 12/1993 | Plummer | 318/610 |

OTHER PUBLICATIONS

"A Clear Vision of Fuzzy Logic," N. Infelise, Control Engineering, Jul. 1991, pp. 28–30.
"Refinements of the Ziegler-Nichols Tuning Formula," C. C. Hang et al., IEE Proceedings-D, vol. 138, No. 2, Mar. 1991, pp. 111–118.

Primary Examiner—Paul Gordon
Attorney, Agent, or Firm—Lowe, Price, LeBlanc & Becker

[57] ABSTRACT

A process control apparatus varies a setpoint weighting factor $\beta$ according to both an error signal and a measurable dynamic characteristic of the process. The dynamic characteristic is either in terms of the normalized gain or normalized dead time of the process. For a PID controller, an initial value of the initial setpoint weighting factor $\beta$, a time at which the initial value should be varied, and the new value of the factor are all automatically set by a self-tuning procedure, wherein a processor is programmed to execute a set of correlation formulae which is applicable to a wide range of industrial processes.

12 Claims, 7 Drawing Sheets

(1) $\beta=1$ (FIXED SETPOINT WEIGHTING)
(2) 30% $\beta=1\rightarrow 0.2$ } VARIABLE SETPOINT
    75% $\beta=0.2\rightarrow 0.65$ } WEIGHTING
(3) $\beta=0.45$ (FIXED SETPOINT WEIGHTING)

CONTROLLER APPARATUS HAVING INPROVED TRANSIENT RESPONSE SPEED BY MEANS OF SELF-TUNING VARIABLE SET POINT WEIGHTING

BACKGROUND OF THE INVENTION

The invention generally relates to the field of control systems, and more particularly to the field of process controller apparatus, in which a self-tuning variable setpoint weighting function is introduced to speed up the transient setpoint response without detrimental effect on load disturbance response characteristics.

For purposes of illustration, a PID (proportional-integral-derivative) controller apparatus is used to describe the prior art and an application of the invention, although the inventive variable setpoint weighting function is not limited thereto. The concepts of the invention are applicable to other controller apparatus such as PI, state variable feedback, Smith Predictor, etc. The description of the invention as applied to a PID controller is illustrative only and is not limiting on the scope of the invention.

Figure 1:
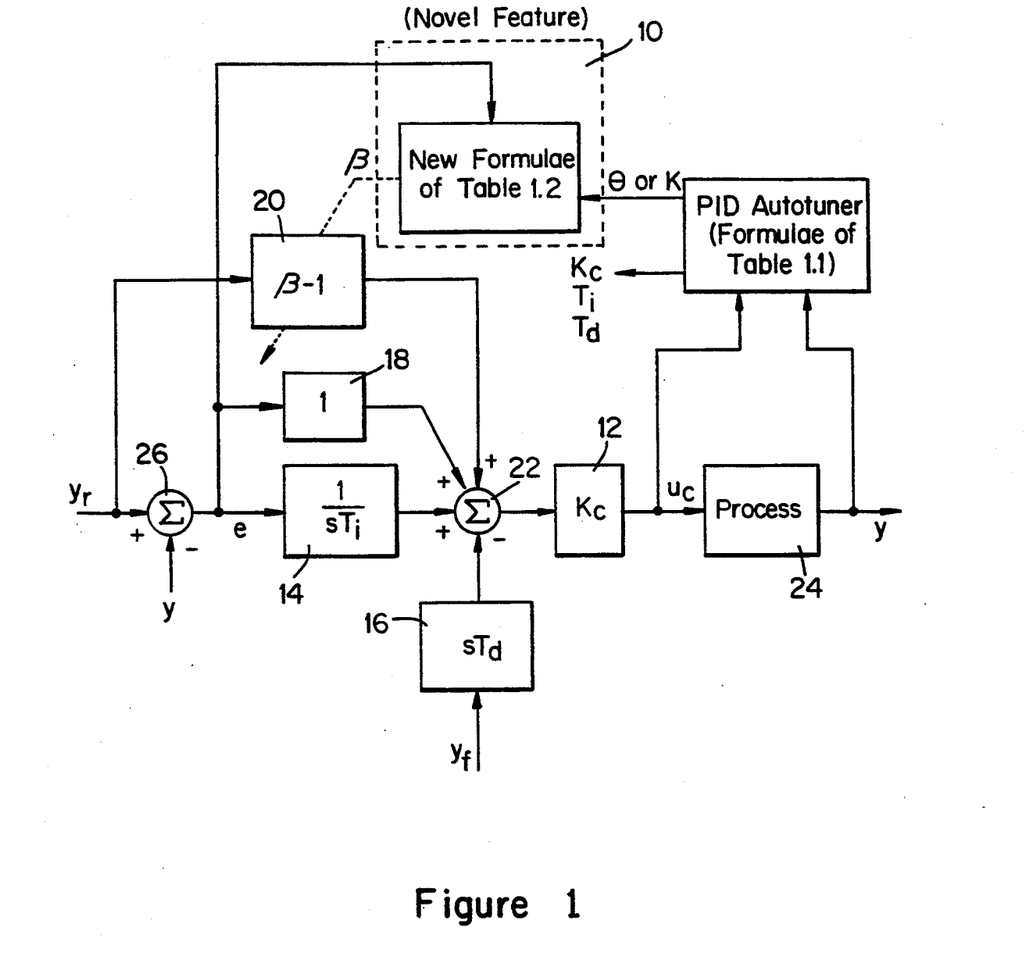
FIG. 1 is a block diagram of a first embodiment of the inventive self-tuning variable setpoint weighting function as incorporated in a PID controller apparatus.

In known controller systems the PID controller parameters are normally tuned to provide a desired load disturbance characteristic. When the dead time ($\theta_d$) of the process is small relative to the dominant process the constant $\tau$ and a low value of normalized dead time $\theta$ results (wherein the normalized dead time is defined as a ratio $\theta_d/\tau$), it is found that the setpoint response exhibits a large overshoot. A conventional prior art solution is to detune the controller settings (in which case the load disturbance response characteristic becomes sluggish), or to introduce setpoint filtering—an approach which is termed two degrees of freedom by some instrument suppliers. Recently, use of a constant setpoint weighting factor $\beta$ has been introduced in the literature. Such a constant setpoint weighting factor is shown in the implementation of FIG. 1, wherein the process control is described by Equation (1):

$$U_p = K_c(\beta Y_r - Y) \tag{1}$$

In Eq. (1), $U_p$ is the proportional part of the controller output, $K_c$ is the proportional gain, $Y_r$ is the setpoint and $Y$ is the process variable. In conventional PID control, the setpoint weighting factor is set at a constant value 1. That is, in the prior art, $\beta = 1$. For constant set point weighting factor values which are smaller, i.e., for controllers wherein $\beta < 1$, it is found that the large overshoot in setpoint response can be drastically reduced without having to sacrifice the load disturbance response.

Figure 2A:
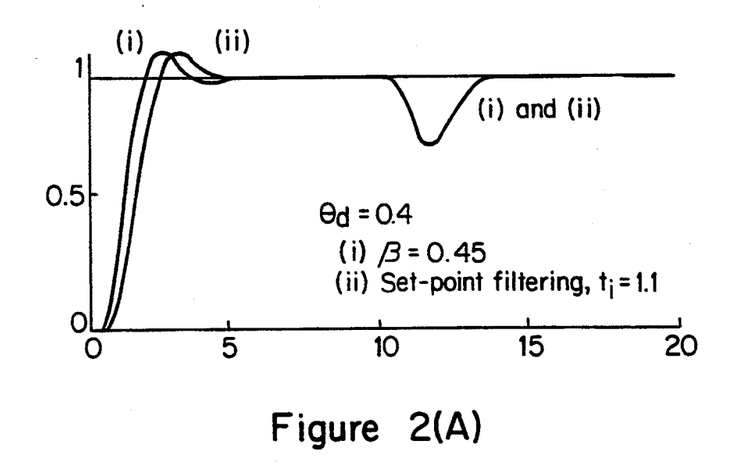
FIGS. 2a and 2b are waveforms showing the effect of applying setpoint weighting ($\beta < 1$) in comparison to setpoint filtering and to detuning of gain.
Figure 2B:
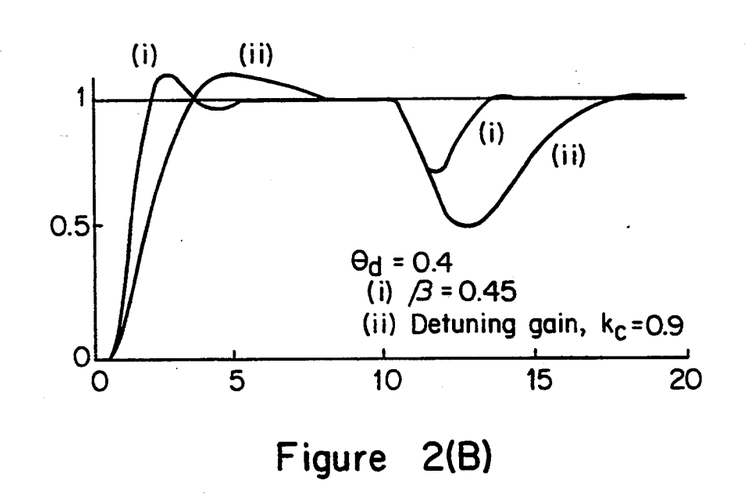

FIGS. 2a and 2b show that setpoint weighting is superior to setpoint filtering and gain detuning, respectively, in terms of response speed. In FIG. 2a the setpoint response for a weighting factor $\beta = 0.45$, shown in curve (i), is seen to be faster than that for set point filtering shown in curve (ii). Similarly, in FIG. 2b the setpoint response for $\beta = 0.45$ (curve i) is faster than that obtained by detuning the gain (curve ii), and moreover the detuned gain curve shows a much poorer load disturbance response.

Figure 6A:
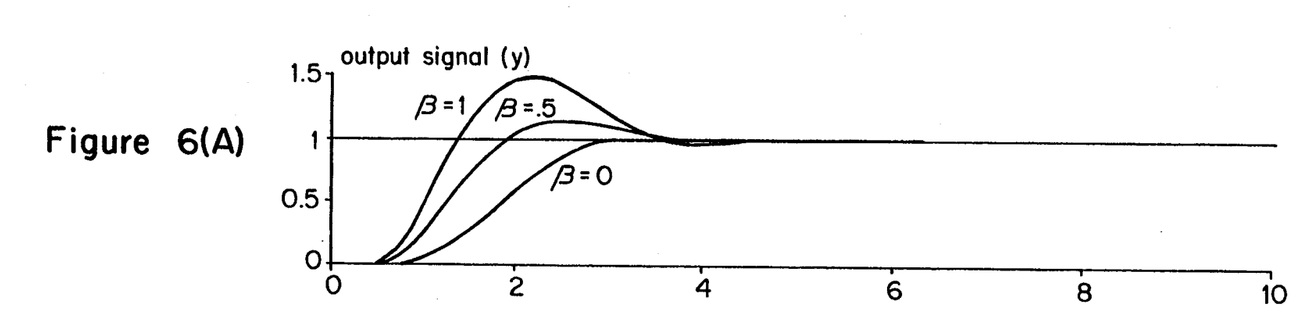
FIGS. 6a, 6b, and 6c show signal waveforms illustrating effects on various process variables of different fixed setpoint weighting.
Figure 6B:
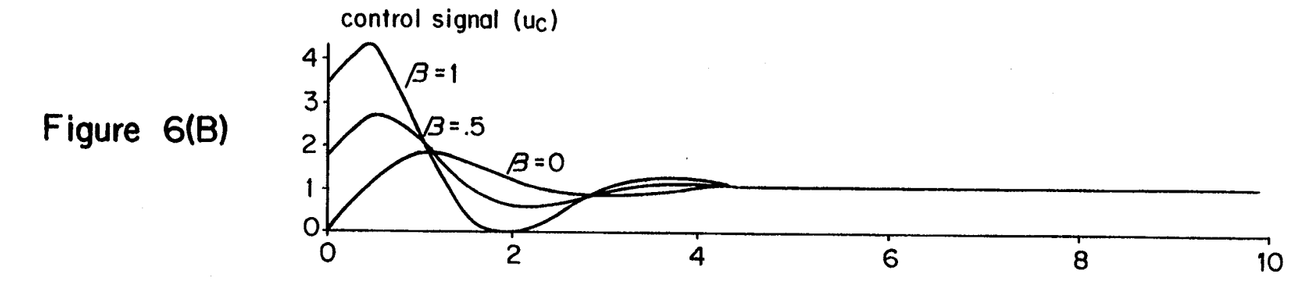
Figure 6C:
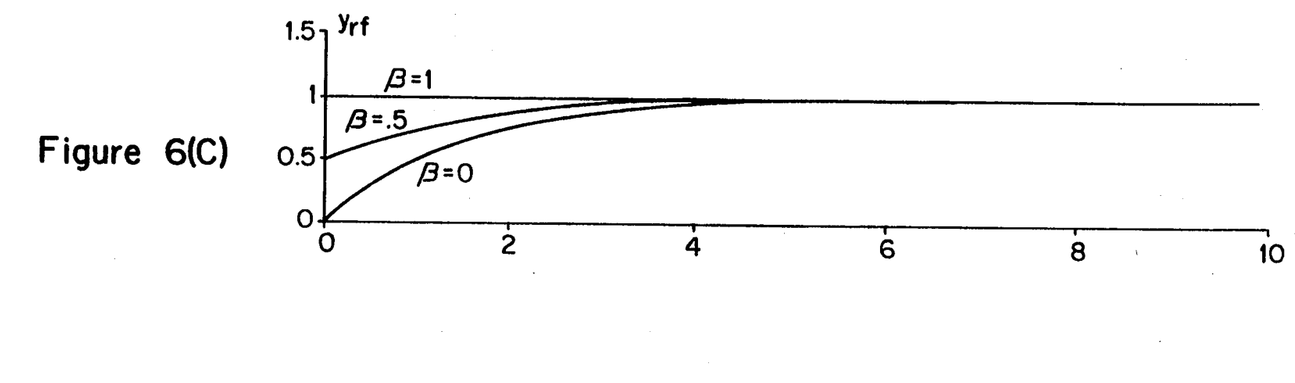

Thus, the method of setpoint filtering suffers from a major disadvantage in that the setpoint response speed (in terms of rise time) is sacrificed. However, provision of a constant (low) setpoint weighting factor suffers from a similar disadvantage when compared with the unity setpoint weighting factor. This can be clearly seen in FIG. 6, in which the response with setpoint weighting ($\beta = 0.5$ or 0.0) is much slower than that with setpoint weighting ($\beta = 1$), although a smaller overshoot is achieved thereby.

This problem cannot be resolved by current self-tuning controllers (e.g., U.S. Pat. No. 4,602,326, issued Jul. 22, 1986 to Kraus), which do not have any setpoint weighting function and in which the overshoot in setpoint response will be large after the controller is tuned for good load disturbance characteristics. Therein, if the controller is tuned using setpoint response, the load disturbance will be sluggish.

SUMMARY OF THE INVENTION

It is accordingly an object of the invention to provide a new and improved controller apparatus overcoming the deficiencies of the prior art.

It is a more specific object of the invention to provide a controller apparatus including elements configured to reduce overshoot of the setpoint response without sacrificing fast rise time.

Still another object of the invention is to provide a controller structure wherein the controller settings can be independently tuned for optimal load disturbance response.

It is yet another object of the invention to provide a controller having variable self-tuning setpoint weighting.

Still a more particular object of the invention is to provide a variable self-tuning setpoint weighting apparatus for a controller, wherein the setpoint weighting factor is set to a large value during a first portion of the set point response, thus to maintain a fast rise time, and is then set to a different, lower value, to reduce overshoot.

It is yet another object of the invention to provide a process for automatically determining appropriate switching instants and suitable values of the setpoint weighting factor $\beta$ for application in a setpoint weighting apparatus for a controller.

It is a more particular object of the invention to determine appropriate switching instants and suitable values of setpoint weighting factor by measuring a normalized gain or normalized dead time of a controller, and to use the measured values in accordance with specific correlation formulae to determine the switching instants and the values for the setpoint weighting factor $\beta$.

Still another object of the invention is to provide continuous variable self-tuning of the setpoint weighting factor for a controller.

Yet another object of the invention is to provide intermittent self-tuning of the setpoint weighting factor for a controller.

It is still another object of the invention to introduce a variable self-tuning setpoint weighting function into a PID or SERVO-controller well-tuned and free of large overshoot, by introducing a setpoint weighting factor $\beta > 1$ in an initial part of the transient response to reduce the rise-time and by subsequently introducing a variable $\beta$ to maintain overshoot tolerance.

It is a more specific object of the invention to implement variable self-tuning setpoint weighting of a controller by incorporating a variable lead-lag filter therein.

BRIEF DESCRIPTION OF DRAWINGS

The accompanying drawings, incorporated into and forming a part of the specification, illustrate several aspects of a preferred embodiment of the present invention and, together with the description, serve to explain the principles of the invention. In the drawings.

DETAILED DESCRIPTION OF THE PREFERRED EMBODIMENT

In accordance with the objects and features of the invention, there are provided a method and apparatus for using a variable setpoint weighting function in a controller.

The new apparatus incorporating the novel variable setpoint weighting function will be described with reference to the accompanying drawings. FIG. 1 shows, in block diagram form, a first embodiment of the inventive self-tuning variable setpoint weighting feature as incorporated in a modification of a typical PID controller apparatus. The variable setpoint weighting feature is indicated at reference numeral 10, surrounded by a dotted outline in FIG. 1. Reference numeral 10 represents a processor implementing computations in accordance the formulae shown in attached Table 1, which provides a new set of correlation formulae for automatically determining the switching instants and values of $\beta$, based on the refined Ziegler-Nichols Tuning Formula. An amplifier 12 (providing a proportional gain $K_c$), an integrator 14, a differentiator 16 and a unity gain amplifier 18 (which may be set to an arbitrary value) are parts of a known PID controller. A setpoint setting amplifier 20 acts on the setpoint $Y_r$ in response to a variable control output of the inventive feature 10.

The output of amplifier 20, along with the outputs of integrator 14, differentiator 16 and amplifier 18 are all inputted to a summing element 22. As seen in the Figure, the output of differentiator 16 is inputted to an inverting (subtracting) input of element 22, and the other inputs to summing element 22 are added thereby. Proportional gain amplifier 12 multiplies the output of summing element 22 by a gain constant $K_c$ to provide an input to the process 24. The process variable Y and the setpoint $Y_r$ are inputted to another summing element 26 which provides an output e representing a difference between the setpoint $Y_r$ and the process variable Y.

As is clear from the illustration of FIG. 1, the setpoint weighting factor $\beta$ only acts on the setpoint $Y_r$, so that the load response is independent of the setpoint weighting factor $\beta$. Indeed, the weighting factor $\beta$ does not act on the response y which is affected by the load.

Accordingly, it will be appreciated that the inventive arrangement permits the PID parameters to be independently tuned for optimal load response.

The setpoint response may be adjusted by setting $\beta$ in a known manner, such as in accordance with the Refined Ziegler-Nichols formula proposed by Hang et al. ("Refinements of Ziegler-Nichols Tuning Formula," IEE Proceedings, Part D., Vol. 138, No. 2, March 1991, pp. 111–118).

In the implementation of FIG. 1, when the setpoint weighting factor $\beta$ is changed it is necessary to attend to the static level of the setpoint $Y_r$ as the weighting factor acts directly on $Y_r$.

Figure 3A:
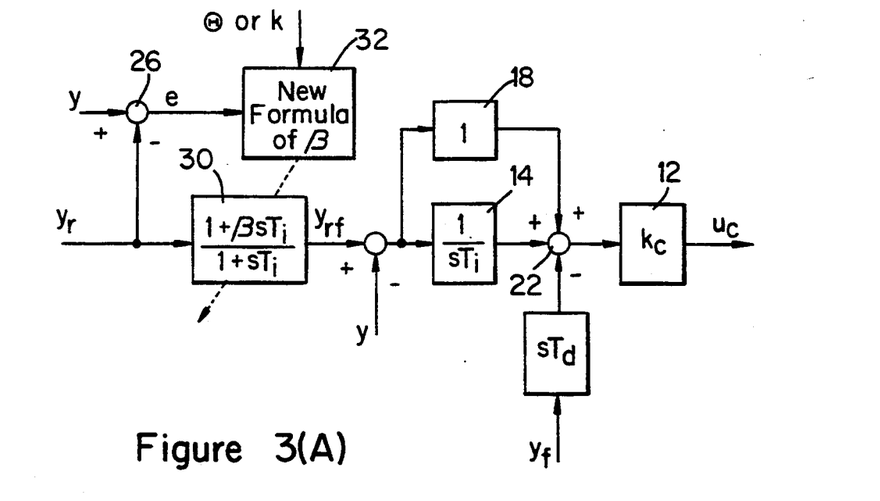
FIG. 3a shows another embodiment of the invention which is more easily implemented than that of FIG. 1.

A second embodiment of the invention is shown in FIG. 3(a). As will be appreciated by those of ordinary skill in the art, the embodiment shown in FIG. 3(a) performs the same function as that of FIG. 1. However, the second embodiment is more easily implemented as the static level in the reference signal does not need special attention, since the variable setpoint weighting factor $\beta$ acts only on the change in setpoint signal $Y_r$.

As shown in FIG. 3(a), in the configuration according to the second embodiment of the invention the additive inputs to summing element 22 are the variable E(s) outputted from unity gain amplifier 18 and the output of integrator 14. In accordance with the invention, there is provided a variable lead-lag filter 30 dependent on the parameter $\beta$, which is controlled by a processor 32 implementing the formulas of attached Table 1.2. As described in the following, processor 32 is programmed to operate in accordance with a program represented by the flow chart provided in FIG. 5.

Figure 3B:
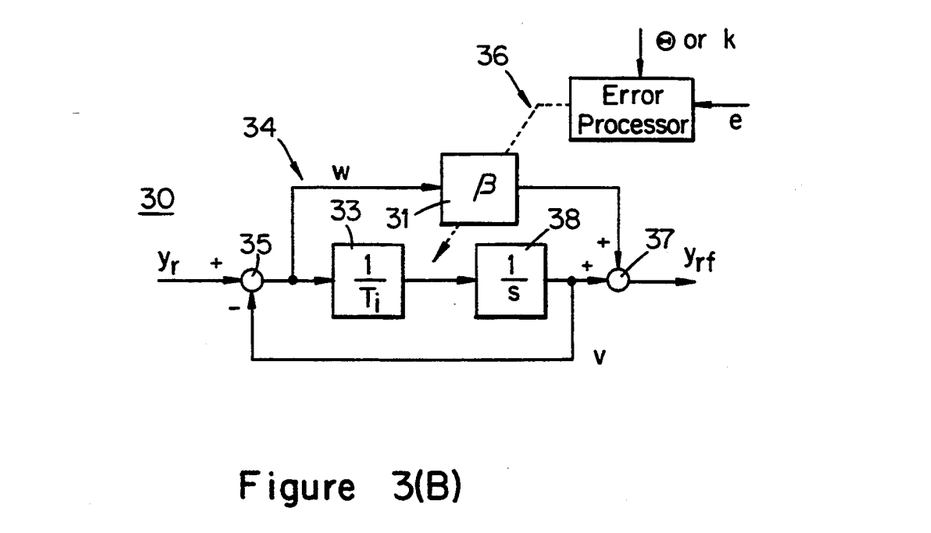
FIG. 3b shows a setpoint filter in the form of a lead-lag filter having a variable lead element.

A more detailed illustration of the variable lead-lag filter of the inventive controller is shown in FIG. 3(b). As shown therein, the filter structure has two parts. A first portion 34, shown in FIG. 3(b), processes the setpoint $Y_r$ to produce a filtered setpoint $Y_{rf}$. Portion 34 includes a setpoint multiplier 31, a difference adder 35, a multiplier 33 connected to the output of adder 35, an integrator 38 operating on the output of multiplier 33, and a summer 37 adding the outputs of setpoint multiplier 31 and the integrator 38 to provide the filtered setpoint $Y_{rf}$. In the first portion 34, the output of integrator 38 is fed back to the subtracting input of adder 35. A second portion 36, shown in the upper part of FIG. 3(b), processes the error e, using knowledge of $\theta$ or K to produce the signal for updating $\beta$ by controlling the multiplier 31.

As hereinabove noted, the physical implementation of the controller apparatus is preferably by means of a microprocessor/digital-computer using known techniques to implement various aspects of the above described functions. However, as will be appreciated by those of ordinary skill in the art, analog electronic circuits may be used for this purpose.

For the preferred digital control implementation, an interface between the (digital) controller and the analog (input) measurements and actuator (output) signals uses analog-to-digital and digital-to-analog converters, respectively, in the same manner as used by conventional digital PID controllers. Accordingly, the present disclosure omits description of such converters. Similarly, the auto-tuning PID algorithm is implemented as a software program (stored in a Programmable Read Only Memory of the microprocessor/digital-computer, for example) for processing the stored data representing the converted input and output signals. The software used for this purpose by the present invention is the same as in other digitally implemented auto-tuning PID controllers and, accordingly, a detailed description thereof is omitted.

In the following disclosure there is described a novel portion of the new controller apparatus, specifically the lead-lag filter 30 with variable parameter, and the parameter adjustment mechanism 36 implemented by processor 32 to control the same. In that regard, it is noted that the setpoint signal $Y_r$, the process variable Y and the normalized dead time $\theta$ for any PID controller are all known parameters which are available as data stored in the memory of the computer used therein.

(i) Implementation of the variable lead-lag filter

Figure 4:
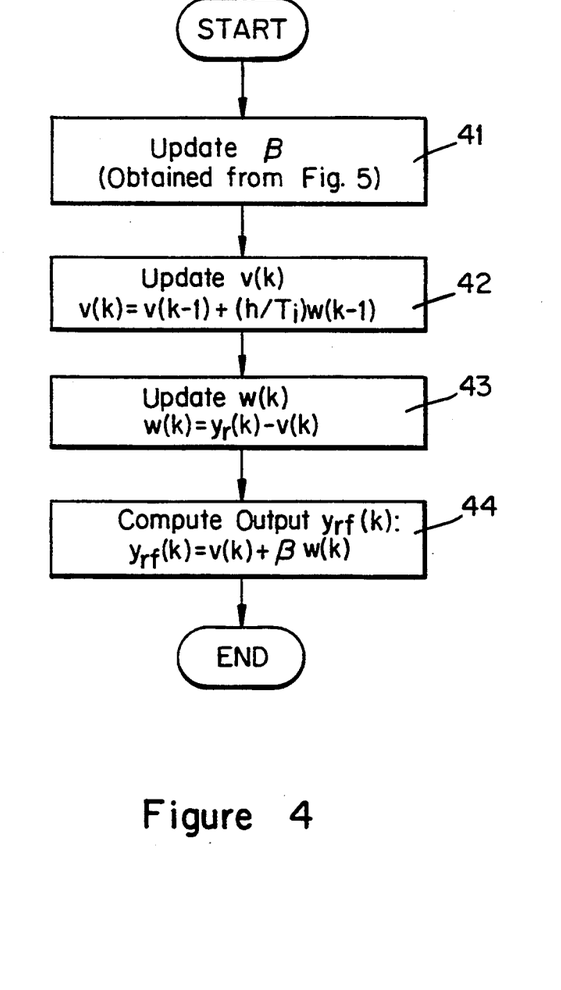
FIG. 4 shows a the flow chart for implementing the variable lead-lag filter of FIG. 3b.

The variable lead-lag filter 30 of the invention is preferably implemented by a computer, programmed to operate in accordance with a flow chart shown in FIG. 4.

In the flow chart of FIG. 4, notation such as V(k) is used to represent the value of a variable V at the sampling instant kh. The input is the setpoint $Y_r$; the variable parameters are the setpoint weighting factor $\beta$, the sampling interval h and the integral time constant $T_i$; the output is the filtered setpoint signal $Y_{rf}$. At step 41 the value of $\beta$ is updated, in accordance with the result of processing performed in the flow chart of FIG. 5. At steps 42 and 43 intermediate parameters V(k) and W(k) are updated in accordance with the equations shown therein. Thus, V(k) is updated by implementation of the equation $$V(k) = V(k-1) + (h/T_i) * W(k-1).$$

At step 43 the value of W(k) is updated in accordance with the equation $$W(k) = Y_r(k) - V(k)$$

and at step 44 the computer is programmed to determine the value of the filtered setpoint $Y_{rf}$ in accordance with the equation $$Y_{rf}(k) = V(k) + \beta * W(k).$$

Thus, the filtered setpoint is determined by the updated values of the intermediate parameters V(k) and W(k) which (in accordance with step 43) relies on the setpoint signal $Y_r$, and $\beta$. The filtered setpoint signal $Y_{rf}$ is outputted by the computer implementing the variable lead-lag filter 30 and added by summing element 26 to the signal representing the process variable Y for further processing in a known manner, as shown in FIG. 3(a).

It will be appreciated that the output signal from the computer representing filtered setpoint signal $Y_{rf}$ may be converted to analog form for addition by an analog summing element, for continued processing. However, those of ordinary skill in the art will recognize that, alternatively, the suction represented by element 26 may be directly digitally implemented on the output of the digitally implemented variable lead-lag filter program represented by FIG. 4, to provide values for further digital processing to implement the operations represented by the integrator block 14, summation 22, and constant multiplication 12, to be followed by conversion to analog form in order to provide the controller output Uc.

The physical elements shown in FIG. 3(b), such as adders 35 and 37, multipliers 31 and 33 and integrator 38 are thus preferably implemented digitally. Any known discretization technique may be used. For example, using the simple backward difference technique, the physical integrator with transfer function (1/s) will be implemented as a signal processing element with a discrete transfer function of $$\left( \frac{h}{1 - z^{-1}} \right),$$

where $z^{-1}$ is the time delay operator and h is the sampling interval.

(ii) Implementation of the parameter adjustment mechanism

The parameter adjustment mechanism is indicated in FIG. 3(a) by the processor-implemented functional block 32. As shown in the Figure, processor 32 processes the error signal e and the process characteristics (either $\theta$ or normalized gain K obtained from the auto-tuner part of the PID controller), and thus produces the variable parameter $\beta$ for use in the variable lead-lag filter 30. The details of the logic and computation performed by this functional block are shown in the flow-chart of FIG. 5.

Figure 5:
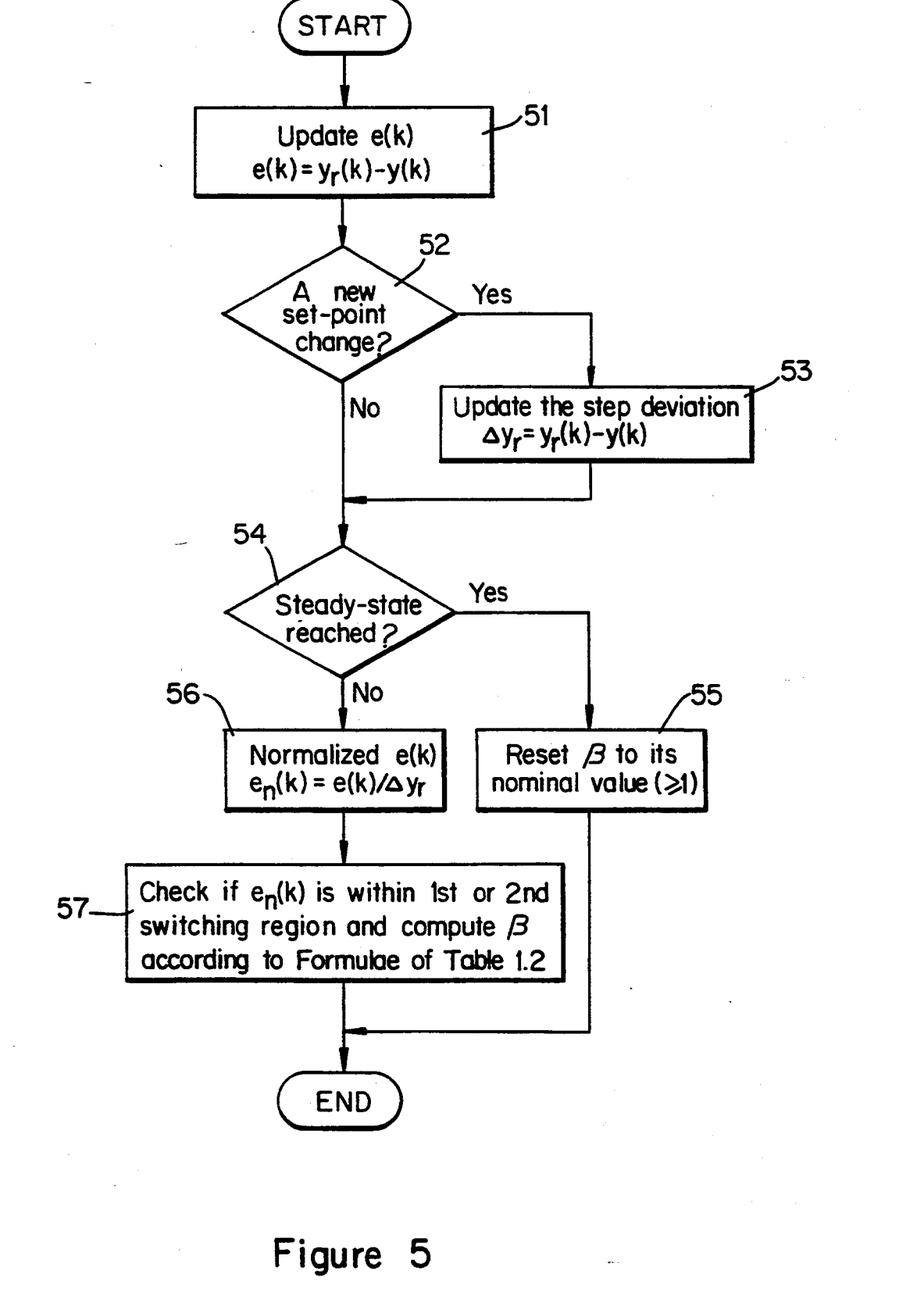
FIG. 5 shows a flow chart for implementing a parameter adjustment mechanism in accordance with the invention.

Therein, at step 51 the processor 32 updates the value of e in accordance with the equation $$e(k) = Y_r(k) - Y(k).$$

At step 52 the processor determines whether a new setpoint change is involved and, if so, updates the step deviation in accordance with the equation illustrated in FIG. 5 at step 53:

$$DY_r = Y_r(k) - Y(k).$$

After the update of step 53, or upon determining that a new setpoint change is not involved, processor 32 executes step 54 and determines whether or not a steady state has been reached. Numerous judging techniques may be used to implement such a determination, such as determining that the magnitude of a predetermined number of preceding updates does not exceed a specified threshold.

If the result of execution of step 54 is affirmative, $\beta$ is reset to its nominal value ($\geq 1$) at step 55. Alternatively, if the result of step 54 is negative, i.e., if the steady state has not been reached, processor 32 executes step 56, wherein the error signal e is normalized by division by the updated step deviation.

$$e_n(k) = e(k)/DY_r.$$

At step 57 it is determined whether the normalized error is within the first or second switching regions, and the corresponding value of $\beta$ is computed in accordance with the formulae at Table 1.2.

Accordingly, the flow charts of FIGS. 4 and 5 provide for a self-tuning and variable setpoint weighting, based on whether the system is operating in a first or second magnitude range of error. Of course, step 57 of FIG. 5 may be implemented to check for any number of ranges of error magnitude, thus to provide any number of setpoint weighting factors. As previously noted for the implementation of FIG. 3(b), the physical processing elements needed to realize FIG. 3(a) and the formula of Table 1.2, namely the various adders, divider, logical check device for determining the switching region, etc., are implemented digitally. The same computer may perform the functions required to implement both FIGS. 3(a) and 3(b), thus implementing the flow charts of both FIGS. 4 and 5, or separate processors may be used. Such multiprocessing arrangements are known in the art and no elaboration is required.

The effect of varying the setpoint weighting factor $\beta$ on the filtered setpoint signal $Y_{rf}$ is clearly seen in FIG. 6, as previously noted. It is also evident from the response of the process output Y in FIG. 6 that, while setpoint weighting with $0<\beta<1$ is a good compromise between the extreme cases of no weighting ($\beta=1$) and first order setpoint filtering ($\beta=0$), the fast rise-time associated with the case of no weighting ($\beta=1$) is not fully exploited. This forms the major motivation of the present invention as hereinabove described which introduces a variable setpoint weighting feature in the controller apparatus.

Figure 7A:
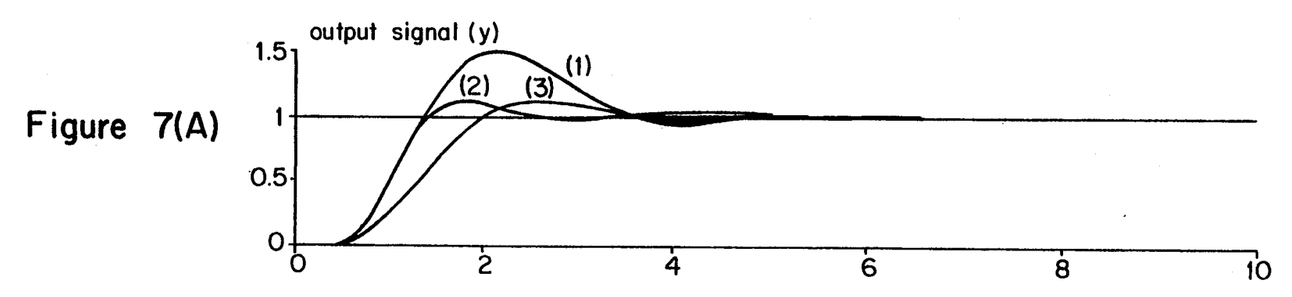
FIGS. 7a, 7b, and 7c show the same variables upon application of a variable setpoint weighting in accordance with the invention.
Figures 7B, 7C:
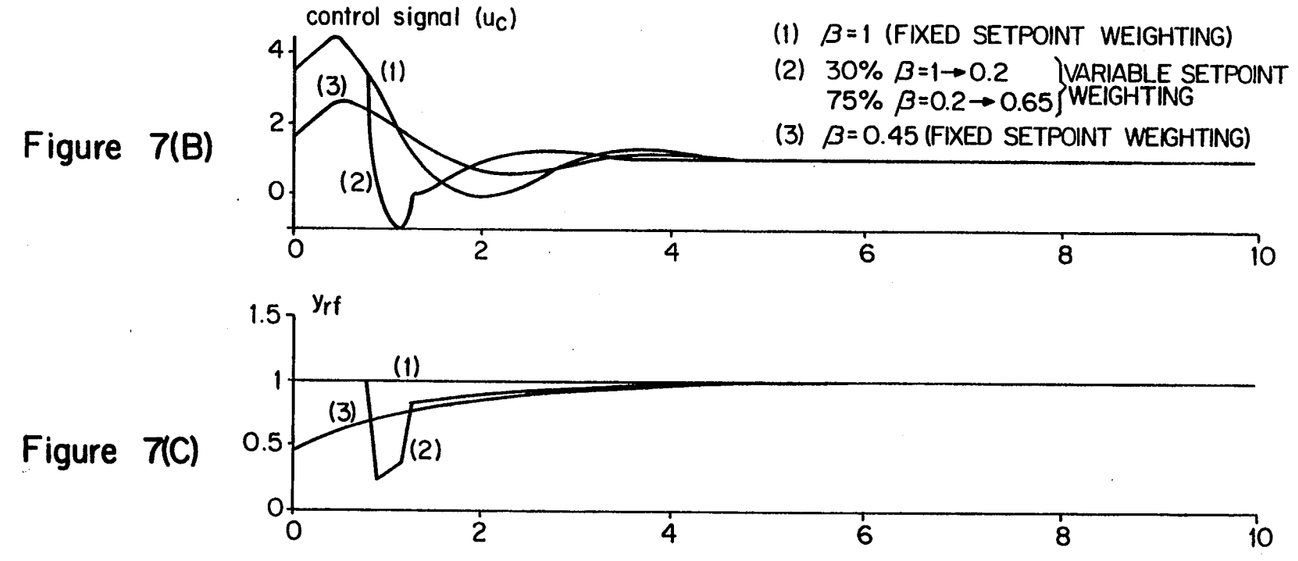

In accordance with the invention, and specifically upon determining the result of step 57 in FIG. 5, as is apparent from Table 1, a larger weighting factor $\beta_J$ is used during the initial period of a setpoint change, e.g., when $|e| \geq x|Dy_r|$, where x is a fraction: $1 \geq x$. Thereafter a smaller weighting factor $\beta_S$ is used to reduce the potential overshoot, hence resulting in a transient response with fast rise-time and small overshoot. Art example of the inventive approach is shown in FIG. 7. This example shows two switching regions, e.g., two different sets of x and $\beta_S$ may be needed for good performance. The switching is more clearly seen by examining the time response of $Y_{rf}$. In other cases, one switching region may be sufficient. The choice of $\beta_J$, $\beta_S$ and x is influenced by the process dynamics, which can be characterized by the normalized process dead-time ($\theta$) or normalized process gain (K), and a suitable correlation formula can be experimentally determined as in the case of the Refined Ziegler Nichols formula.

The improvement in transient performance of a controller modified in accordance with the present invention can also be explained by analysis of FIG. 3 and FIG. 6. Suppose $\beta=0$; then the response is well damped but sluggish. With $\beta=1$, the response is fast but with large overshoot; note that the load disturbance is fast and well-damped—the large overshoot in the setpoint response is caused by having a significant transfer function zero between $Y_R(s)$ and $y(s)$, as given by $(1+BsT_i)$.

By providing the variable $\beta$ in accordance with the invention as hereinabove described, there is thus provided the best of the two extremes: a significant 'transfer-function zero' with large $\beta$ when a setpoint change is made, and a smaller 'transfer-function zero' with small $\beta$ when the process and output approaches the setpoint. The present invention can thus also be called 'variable controller zero.'

Extending the inventive concept further, the concept of a lead-lag filter with variable coefficient can be generalized quite arbitrarily in order to improve the risetime of a control system, even though the original setpoint response has a small (or no) overshoot. The concept of the present invention is different from that associated with varying the magnitude of a setpoint by means of fuzzy logic, as described in the publication "A Clear Vision of Fuzzy Logic," N. Infelise, *Control Engineering*, July 1991, pp. 28–30.

The fuzzy logic magnitude variation disclosed therein is not self-tuning and depends more on operator experience than on solid control system analysis.

Finally, it is noted that, because the transfer-function 'zero' and not the 'pole' of the controller apparatus is varied on-line, stability of the system is not endangered.

The foregoing description of the preferred embodiment of the invention has been presented for purposes of illustration and description. It is not intended to be exhaustive or to limit the invention to the precise forms disclosed, since many modifications or variations thereof are possible in light of the above teaching. All such modifications and variations are within the scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

TABLE 1

ATTACHMENT TABLES
Formulae of variable setpoint weighting based on refined Z-N tuning 1.1 Refined Z-N tuning formula
For normalized deadtime within $0 \sim 0.25$ Proportional gain: $K_c = 0.6 k_u$ Integral time: $T_i = \dfrac{t_u}{2}$ Derivative time: $T_d = \dfrac{t_u}{8}$ For normalized deadtime within $0.25 \sim 0.5$ $K_c = 0.6 k_u$ $\dfrac{T_i}{t_u} = -0.188\theta + 0.512$ $T_d = \dfrac{T_i}{4}$ where $k_u$ and $t_u$ are ultimate gain and period respectively, $\theta$ is the normalized deadtime of the process.

1.2 New formulae of variable setpoint weighting ($\beta$)
a) Formulae for processes with normalized deadtime within $0 \sim 0.25$
   1st switching point   0.3
   2nd switching point   $-2.0550\theta + 1.195$
   1st value of $\beta$   1.1
   2nd value of $\beta$   0.2
   3rd value of $\beta$   $0.6420\theta + 0.506$
b) Formulae for processes with normalized deadtime within $0.25 \sim 0.5$
   1st switching point   0.15
   2nd switching point   $4.374\theta^2 - 4.478\theta + 1.546$
   1st value of $\beta$   1
   2nd value of $\beta$   0.2
   3rd value of $\beta$   $-14.217\theta^3 + 14.952\theta^2 - 4.280\theta + 0.953$ where we assume set point is 1 and $\theta$ is normalized deadtime of the process.

What is claimed is:

1. In a process control apparatus having input means for inputting a first signal representing a setpoint for a process and a second signal representing a process variable, means for generating an error signal representing a difference between said first and second signals, and control means for providing a control signal for controlling the process as a function of said first and second signals, the improvement comprising:

filter means connected to receive said first signal for generating a filtered setpoint signal;

said filter means including:

first means using a setpoint weighting factor $\beta$ for converting said first signal to said filtered setpoint signal, and second means for varying the setpoint weighting factor $\beta$ in response to a difference between said setpoint and said process variable represented by said error signal.

2. A process control apparatus as recited in claim 1, wherein said filter means comprises a variable lead-lag filter including magnitude means for assigning a magnitude to a signal therein in accordance with said setpoint weighting factor $\beta$ to generate said filtered setpoint signal, said magnitude means responsive to said second means for varying the magnitude assigned to said signal in accordance with variations in said setpoint weighting factor $\beta$, whereby said filtered setpoint signal has a magnitude varying in accordance with said error signal.

3. A process control apparatus as recited in claim 1, wherein said second means comprises programmed processor means for executing a sequence of program steps to obtain varying magnitudes for said setpoint weighting factor $\beta$ as a function of said error signal.

4. A process control apparatus as recited in claim 3, wherein said programmed processor means implements a variable lead-lag filter having a characteristic dependent on said setpoint weighting factor $\beta$.

5. A process control apparatus as recited in claim 3, wherein said programmed processor means comprises determining means for determining whether said error signal has a value in a first or a second range and for assigning a respective first or second value of said setpoint weighting factor $\beta$, in accordance with a determination that said error signal is in said first or second range, said first and second values of said setpoint weighting factor $\beta$ being different from each other.

6. A process control apparatus as recited in claim 5, wherein said determining means assigns a first setpoint weighting factor $\beta$ during an initial period of setpoint change upon determining said error signal to be in excess of a predetermined threshold value, and assigns a second setpoint weighting factor $\beta$ during a subsequent period upon determining said error signal to be less than said predetermined threshold value, wherein said first setpoint weighting factor $\beta$ has a greater value than said second setpoint weighting factor $\beta$.

7. A process control apparatus as recited in claim 5, wherein said determining means assigns a first setpoint weighting factor $\beta$ upon determining said error signal to be in excess of a predetermined threshold value, and assigns a second setpoint weighting factor $\beta$ upon determining said error signal to be less than said predetermined threshold value, wherein said first setpoint weighting factor $\beta$ has a greater value than said second setpoint weighting factor $\beta$.

8. A process control apparatus as recited in claim 1, wherein said second means comprises magnitude control means for measuring values of at least one of normalized gain and normalized dead time of the process control apparatus for obtaining varying magnitudes for said setpoint weighting factor $\beta$.

9. A process control apparatus as recited in claim 8, wherein said magnitude control means is responsive to said values measured thereby to establish switching times for switching magnitudes for said setpoint weighting factor $\beta$.

10. A process control apparatus as recited in claim 1, wherein said filter means comprises a filter having a variable lead element variable by adjustment of said setpoint weighting factor $\beta$.

11. A process control apparatus as recited in claim 10, comprising PID (proportional-integral-derivative) control means for providing said control signal, said PID control means incorporating said filter means.

12. A process control apparatus as recited in claim 11, wherein said second means provides a first value of said setpoint weighting factor $\beta$ for a first difference between said setpoint and said process variable and a second value of said setpoint weighting factor $\beta$ for a second difference between said setpoint and said process variable, wherein said first difference is greater than said second difference and said first value of said setpoint weighting factor $\beta$ is greater than said second value of said setpoint weighting factor $\beta$, said filter means thereby improving a rise-time of a setpoint response of the apparatus without sacrificing damping of the process variable controlled thereby.

* * * * *

UNITED STATES PATENT AND TRADEMARK OFFICE
CERTIFICATE OF CORRECTION

PATENT NO. : 5,404,289
DATED : April 4, 1995
INVENTOR(S) : Chang C. HANG et al.

It is certified that error appears in the above-indentified patent and that said Letters Patent is hereby corrected as shown below:

Column 5, line 62, change "suction" to --summation--.
Column 6, line 40, change "DY$_r$" to --$\Delta Y_r$--;
Column 6, line 57, change "DY$_r$" to --$\Delta Y_r$--.
Column 7, line 28, change "DY$_r$" to --$\Delta Y_r$--.

Signed and Sealed this

Fifth Day of September, 1995

Attest:

BRUCE LEHMAN

Attesting Officer  Commissioner of Patents and Trademarks